US007600305B2

(12) United States Patent
Ploeger et al.

(10) Patent No.: US 7,600,305 B2
(45) Date of Patent: Oct. 13, 2009

(54) SHAFT SEAL PULLING DEVICE

(75) Inventors: Randall J. Ploeger, Clarinda, IA (US); Robert S. Westbrook, Kennesaw, GA (US)

(73) Assignee: Lisle Corporation, Clarinda, IA (US)

( * ) Notice: Subject to any disclaimer, the term of this patent is extended or adjusted under 35 U.S.C. 154(b) by 0 days.

(21) Appl. No.: 11/453,472

(22) Filed: Jun. 15, 2006

(65) Prior Publication Data

US 2007/0006437 A1 Jan. 11, 2007

Related U.S. Application Data

(60) Provisional application No. 60/697,180, filed on Jul. 7, 2005.

(51) Int. Cl.
*B23P 19/02* (2006.01)

(52) U.S. Cl. ............................ 29/235; 254/28; 254/25; 254/131

(58) Field of Classification Search .................. 29/235, 29/267; 254/129, 130, 131, 28, 25
See application file for complete search history.

(56) References Cited

U.S. PATENT DOCUMENTS

| | | | | |
|---|---|---|---|---|
| 1,372,389 | A * | 3/1921 | Bailey et al. | 29/213.1 |
| 2,629,584 | A * | 2/1953 | Cannon | 254/120 |
| 3,274,675 | A * | 9/1966 | Jackson | 29/267 |
| 3,908,438 | A * | 9/1975 | Norden | 29/267 |
| 4,049,236 | A * | 9/1977 | Grill et al. | 254/28 |
| 4,211,446 | A | 7/1980 | Shultz, Sr. | |
| 4,476,861 | A | 10/1984 | Dimakos et al. | |
| 5,058,255 | A | 10/1991 | Qualkenbush | |
| 5,109,739 | A | 5/1992 | Hull et al. | |
| 5,245,737 | A | 9/1993 | Perea | |
| 6,397,447 | B1 | 6/2002 | Christopherson et al. | |
| 6,880,217 | B2 * | 4/2005 | Garst | 29/235 |

OTHER PUBLICATIONS

KD Pullers—Seal and Pilot Bearing Puller, No. KD 2824 and Seal Puller, No. KD 3245—http://www.mytoolstore.com—p. 2—Jun. 14, 2005.
Cal Van Tools—Low Profile Seal Puller—No. CAL49300—http://thetoolwarehouse.ne—p. 1—Jun. 14, 2005.
Invention Disclosure Agreement dated Nov. 7, 1983 by Jerry A. Crouso for tool for pulling seals.
Invention Disclosure Agreement dated Dec. 21, 1986 by Hilery T. Temple for seal removal tool.
Invention Disclosure Agreement dated May 2, 1990 by John T. Poore for Tool for removing round, friction fit seals.
Invention Disclosure Agreement No. 99-005 dated Dec. 28, 1998 by William A. Michalak for levering seal puller.
Invention Disclosure Agreement No. 04-036 dated Dec. 19, 2003 by Robert S. Westbrook for camshaft and crankshaft oil seal remover.

* cited by examiner

*Primary Examiner*—Lee D Wilson
(74) *Attorney, Agent, or Firm*—Banner & Witcoff, Ltd.

(57) ABSTRACT

A seal pulling tool includes an elongate shaft extending from a manual grip handle. The shaft is bent and includes a seal gripping hook at its outer end and an adjustable fulcrum support post slidably mounted and laterally projecting from the shaft intermediate the handle and hook.

3 Claims, 3 Drawing Sheets

SHAFT SEAL PULLING DEVICE

CROSS REFERENCE TO RELATED APPLICATION

This is a utility application based upon, incorporating by reference and claiming priority to provisional application Ser. No. 60/697,180 filed Jul. 7, 2005 entitled "Shaft Seal Pulling Device".

BACKGROUND OF THE INVENTION

In a principal aspect the present invention relates to a tool for removal of shaft seals, for example, seals of the type utilized in internal combustion engines. Thus, the tool of the invention is designed for removing seals of the type which are utilized with a shaft, such as a cam shaft or crank shaft or otherwise in an internal combustion engine.

In the past, various types of seal removal tools have been proposed such as the tool offered by applicant's assignee, Seal Puller, Product No. 56750. Other types of seal pullers are also available in the marketplace such as KD Seal and Pilot Bearing Puller, KD Model 2824 and KD Seal Puller, Model No. 3245. For removal of large seals these tools are quite useful. However, for removal of the smaller seals used in more recent engine designs, such seal pullers are generally not as utilitarian. Thus, there developed a need for an improved seal puller device or tool.

SUMMARY OF THE INVENTION

Briefly, the present invention comprises a seal pulling device or tool having an elongate shank or lever arm with a manual handle at one end, an adjustable support post located intermediate the handle and the opposite end to provide a first class lever arm construction having the support post serve as a fulcrum intermediate the ends of the lever arm. A hook assembly is provided at the opposite or outer end for engaging or gripping and removing a seal.

An embodiment of the invention includes a shank which is articulated intermediate the handle and the fulcrum or support post. The support post, which comprises the fulcrum, may thus be adjusted longitudinally on the shank or lever arm to thereby adjust the mechanical advantage of the tool and to facilitate placement of the tool during usage. The hook assembly is pivotally mounted at the extreme outer end of the tool and projects from the tool outwardly therefrom typically at an angle which may be adjusted. The shape or configuration of the hook and the mechanism for attachment of the hook to the shank may also be adjusted.

Thus it is an object of the invention to provide an improved seal pulling device or tool.

It is a further object of the invention to provide a seal pulling device which is adjustable in order to alter the mechanical advantage as well as the positioning of the tool in order to facilitate removal of a seal.

A further object of the invention is to provide a tool for removing seals which is rugged, inexpensive and efficient.

Yet another object of the invention is to provide a tool which will enable removal of seals utilized in a number of environments and having a number of configurations, sizes and shapes.

Yet another object of the invention is to provide a seal pulling device or tool which will enable removal of seals of various sizes including small size seals used in automotive environments.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
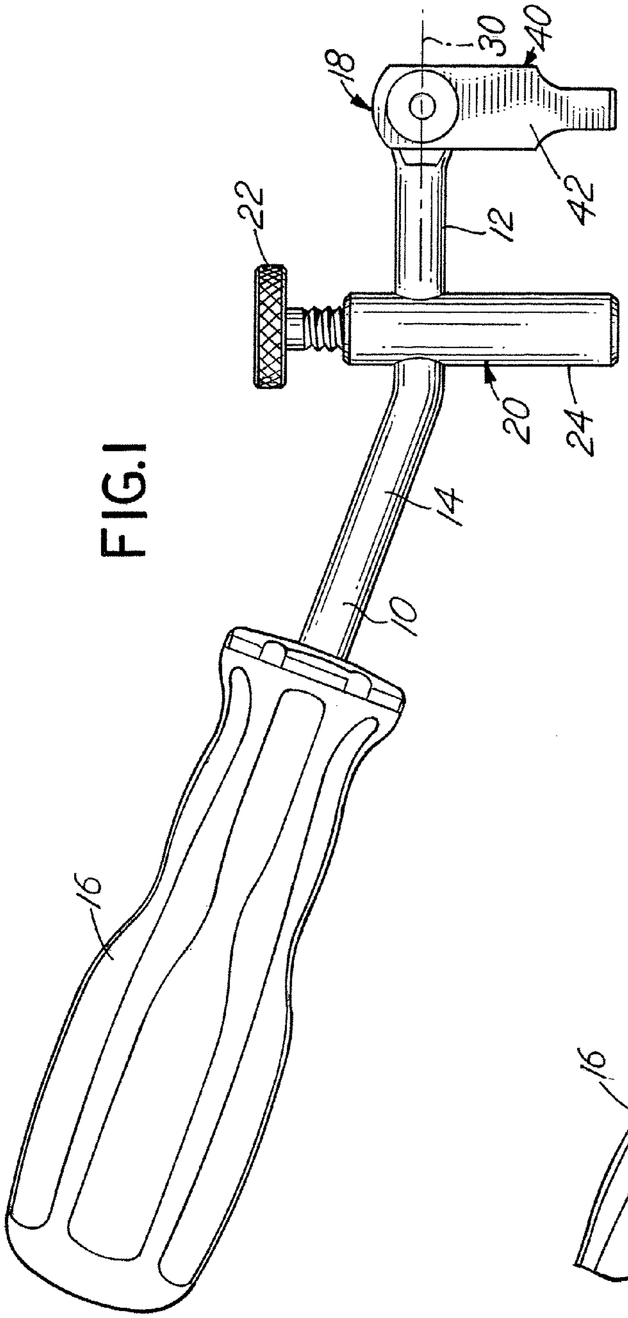
FIG. 1 is a side view of an embodiment of the seal pulling device or tool of the invention.

Referring to the Figures, FIG. 1 depicts an embodiment of the seal removal tool. The tool includes a generally cylindrical cross section or rod shaped shank 10 having a first run 12 and a connected second run 14 forming an angle with or articulated with respect to the first run 12. The shank 10 includes a handle end having a handle 16 molded on or attached thereto and a hook member or hook assembly end 18. Positioned on the first run 12, intermediate the handle 16 and the hook end 18, is a push rod and fulcrum assembly 20. The push rod and fulcrum assembly 20 includes a thumb screw 22 which facilitates attachment of the push rod 24 to the first run 12 so that the push rod 24 may be fixed in position and non-rotatable as well as retained longitudinally with respect to an axis 30. Thus, the push rod 24 includes a throughbore 25 and may be longitudinally moved along the length of the first run 12 as well as rotated about the axis 30 of the first run 12 in order to set or adjust the tool in a proper manner to enable effective seal removal.

Figure 2:
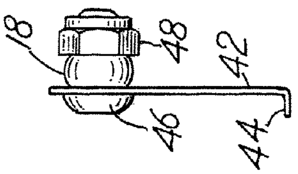
FIG. 2 is an end view of the hook assembly of the device of FIG. 1.
Figure 5:
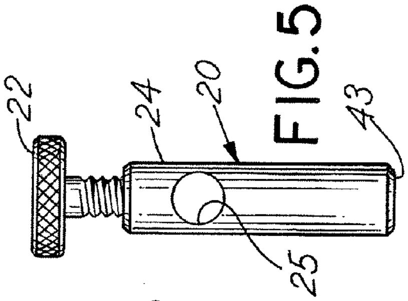
FIG. 5 is a side view of the push rod and fulcrum assembly of the tool of FIG. 1.
Figure 4:
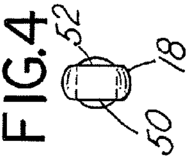
FIG. 4 is an end view of the shank of the tool of FIG. 1.
Figure 3:
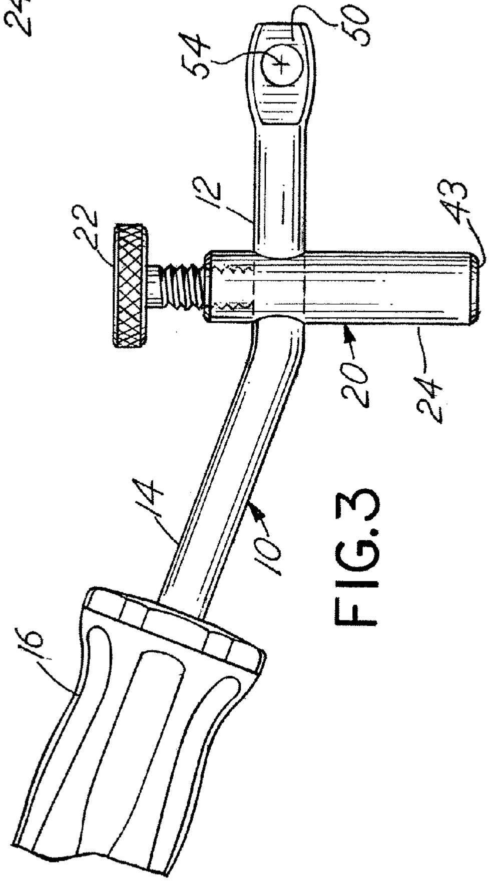
FIG. 3 is a side view of a sub-assembly of the tool of FIG. 1.

The distal or outer hook end 18 of the shank 10 includes a hook assembly 40. The hook assembly 40 includes a hook member 42 which is a planar flat steel hook having an end hook section 44 extending transversely to member 42 as in FIG. 2. A cap screw 46 is used to connect the hook member 42 to the hook end 18 of the shank 10. A lock nut 48 cooperates with the cap screw 46 to fix the hook member 42 rigidly in position on the shank 10. The shank 10 includes flats, such as the flat 50 in FIG. 3, and the flat 52 in FIG. 4. The flats 50, 52 facilitate proper engagement or seating of the hook member 42 onto the distal end 18 of the shank 10. The hook member 42 may be attached to either side of the distal end 18 inasmuch as there are flats 50 and 52 on both sides thereof. The hook member 42 may also be pivoted about an axis 54 which is transverse to the longitudinal axis 30 of the first run 12. The hook section 44 may be oriented in either sense or direction and thus is reversibly mounted on cap screw 46.

Preferably, the push rod 24 includes a circular bore passage 25 so it may slidably move along the first run 12 which is generally cylindrical in configuration. Thus, the push rod 24 may be positioned rotatably as well as longitudinally on the first run 12 once the thumb screw 22 is loosened. Upon tightening of the thumb screw 22 the push rod 24 will be maintained in a substantially fixed, non-rotatable and non-movable position. The passage 25 and/or run 12 may be keyed to each other or the run 12 may include axial extending flats or notches.

Figure 6:
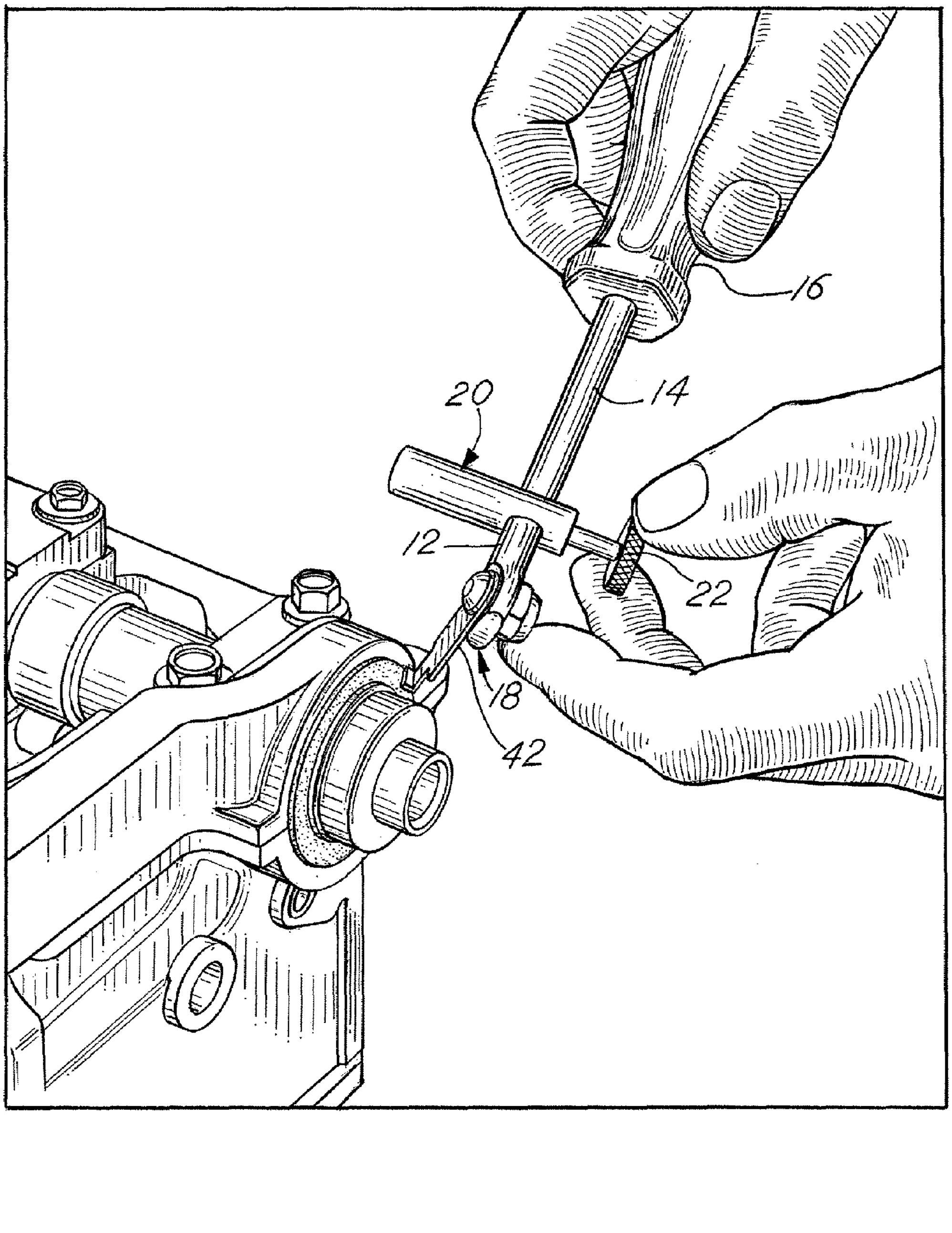
FIG. 6 is a pictorial view depicting the manner in which the tool of FIG. 1 is positioned in order to effect the removal of a seal associated with a shaft of a motor vehicle engine.
Figure 7:
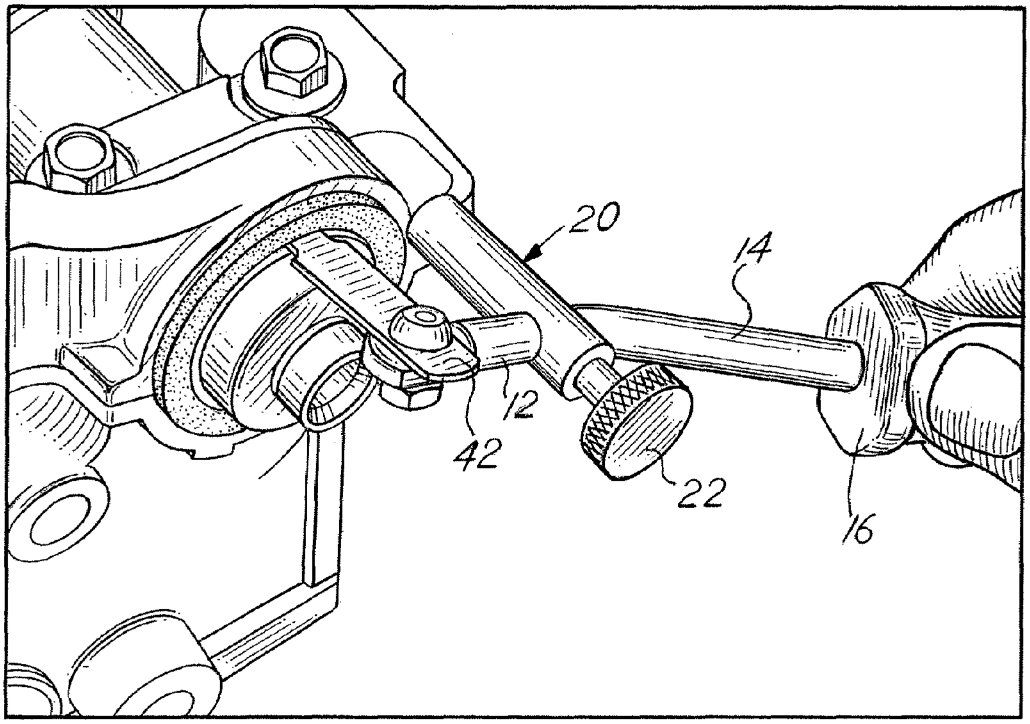
FIG. 7 is a pictorial view depicting the manner in which a seal is engaged with the hook assembly of the device of FIG. 1.
Figure 8:
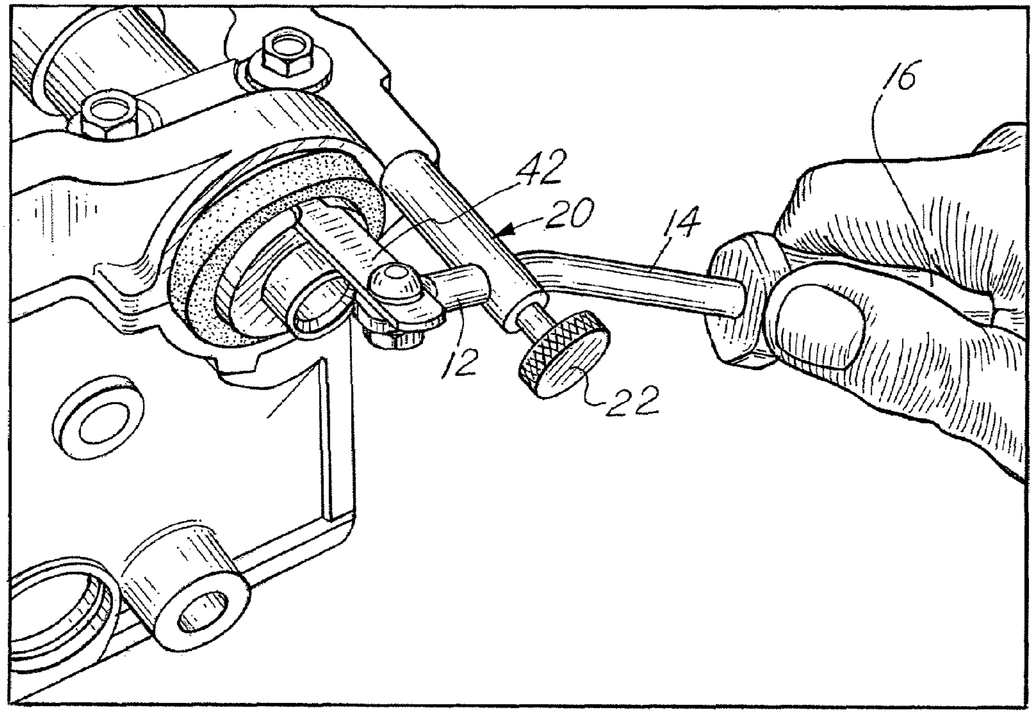
FIG. 8 is a pictorial view illustrating the manner of use of the pulling device or tool of FIG. 1.

Referring to FIGS. 6-8 there is depicted the manner of use of the tool. The push rod 42 includes a fulcrum or outer end surface 43 which maybe positioned against a part of the motor or engine of a vehicle, for example, as depicted in FIG. 8 with the hook member 42 and, more particularly, the hook section 44 thereof positioned to engage the underside or inside of a seal. The handle 16 may then be manipulated or pivoted to withdraw the seal from the shaft on which the seal was mounted as depicted, for example, in FIGS. 7 and 8.

Because of the adjustability of the various component parts, the tool is useful for multiple types of seal removal from various shapes and configurations of shaft assemblies. That is, the push rod and fulcrum assembly 20 may be adjusted to accommodate various sizes of seals and various types of seals and engine constructions. The shank 10 may be cylindrical or have another cross sectional configuration. The hook member 42 may also be shaped and adjusted for facilitating insertion thereof between the seal and the shaft associated with a seal. Thus, the distal hook end section 44 of the hook assembly, or hook member 42, is such that it facilitates placement between a shaft and a seal. The particular configuration of the hook member 42 may become a feature utilized in the preferred embodiment of the invention. Nonetheless, various other alternatives and configurations, sizes and shapes of the various component parts may be adopted. Thus, the invention is limited only by the following claims and equivalents thereof.

What is claimed is:

1. A seal pulling device comprising, in combination:

an elongate cylindrical shank with a cylindrical surface, longitudinal axis, a handle end and a hook end with a shaped outer end section (18);

a handle at the handle end of the shank, said shank including a first straight run at the hook end, and a second run at the handle end joined to the first run, said second run forming an angle with the first run;

a push rod and fulcrum assembly attached to the shank intermediate the handle end and the hook end, said push rod assembly including an elongate fulcrum support member mounted on the shank first straight run for slidable movement longitudinally and independent rotational movement about the longitudinal axis of the shank on said first run and further including a mechanism for engaging the cylindrical shank surface to maintain the fulcrum support member at a fixed, non-rotatable, non-slidable position on the shank on said first run, said fulcrum support member extending generally transversely from the longitudinal axis (30) of said shank first run;

a hook assembly attached to the first run at the shaped outer end section (18) of the hook end of the shank, said hook assembly including a flat, generally uniform thickness, generally thin, planar, hook member (40) sized to fit between a shaft and seal, said hook member (40) including a seal engaging flat, planar end hook section (44) extending transversely from a flat, planar hook member section (42); and an adjustable attachment device at an opposite end of said hook member for attaching the hook assembly to the shank outer end section (18), said adjustable attachment device including a connection mechanism for the hook member section (42) to allow rotational movement of the hook assembly about a pivot axis (54) generally transverse to the longitudinal axis (30) of the shank, said connection mechanism comprising first and second flats (50, 52) on outside, opposite sides of the outer end section (18) of the hook end of the shank for cooperative placement of the flat, planar hook member section (42) against one of said flats, said flat end hook section (44) projecting parallel to the pivot axis (54) from the flat, planar hook member section (42) and a fastener for fixedly attaching the hook assembly against said one of said flats with the end hook section (44) transverse to said flats and extending parallel to the pivot axis (54) and said planar hook member section (42) parallel to the longitudinal axis (30).

2. The device of claim 1 wherein the push rod and fulcrum assembly includes a thumb screw for holding the support member in a fixed position.

3. The device of claim 1 wherein the fastener for the hook member comprises a cap screw and lock nut.

* * * * *